United States Patent
Hoelen et al.

(10) Patent No.: US 7,172,328 B2
(45) Date of Patent: Feb. 6, 2007

(54) COMPACT LIGHTING SYSTEM AND DISPLAY DEVICE

(75) Inventors: Christoph Gerard August Hoelen, Eindhoven (NL); Nicola Bettina Pfeffer, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 108 days.

(21) Appl. No.: 10/511,972

(22) PCT Filed: Mar. 27, 2003

(86) PCT No.: PCT/IB03/01225

§ 371 (c)(1),
(2), (4) Date: Oct. 20, 2004

(87) PCT Pub. No.: WO03/091771

PCT Pub. Date: Nov. 6, 2003

(65) Prior Publication Data

US 2005/0140849 A1   Jun. 30, 2005

(30) Foreign Application Priority Data

Apr. 25, 2002   (EP) ................................. 02076647

(51) Int. Cl.
*F21V 7/04* (2006.01)
(52) U.S. Cl. ........................ 362/610; 362/626; 362/628
(58) Field of Classification Search ................ 362/610, 362/615, 616, 619, 623–626, 628
See application file for complete search history.

(56) References Cited

U.S. PATENT DOCUMENTS

| | | | |
|---|---|---|---|
| 5,359,691 A | 10/1994 | Tai | |
| 5,575,549 A | 11/1996 | Ishikawa et al. | 362/31 |
| 5,671,994 A * | 9/1997 | Tai et al. | 362/603 |
| 5,727,107 A * | 3/1998 | Umemoto et al. | 385/116 |
| 6,585,386 B1 * | 7/2003 | Yano et al. | 362/614 |
| 6,745,506 B2 * | 6/2004 | Maas et al. | 40/546 |
| 6,908,204 B2 * | 6/2005 | Kraft | 362/628 |
| 7,073,933 B2 * | 7/2006 | Gotoh et al. | 362/624 |

* cited by examiner

*Primary Examiner*—John Anthony Ward
*Assistant Examiner*—David Makiya (57) ABSTRACT

A compact backlight system has a light-emitting panel (1) with a front wall (2), a rear wall (3) situated opposite thereto, and furthermore, between the front and the rear wall (2, 3), a translucent input edge surface (4) for coupling light into the light-emitting panel (1). A light source (6, 6', . . . ) is associated with the input edge surface (4). According to the invention, the rear wall (3) in a first portion (12) of the light-emitting panel (1) is provided with a multiplicity of steps (13, 13', . . . ), and a second portion (22) of the light-emitting panel (1) widens from the input edge surface (4) in a direction facing the first portion (12). Preferably, a surface (17) of the steps (13, 13', . . . ) facing the input edge surface (4) makes an angle $\beta_{av} \geq 5°$ (with respect to a normal on a bisecting plane (20) bisecting the light-emitting panel (1).

15 Claims, 4 Drawing Sheets

COMPACT LIGHTING SYSTEM AND DISPLAY DEVICE

The invention relates to a lighting system provided with a light-emitting panel comprising a front wall, a rear wall situated opposite thereto, and furthermore, between the front and the rear wall, a translucent input edge surface for coupling light into the light-emitting panel, while at least a light source is associated with the input edge surface, and while, in operation, light originating from the light source is incident on the input edge surface and distributes itself in the light-emitting panel.

The invention also relates to a display device provided with said lighting system.

Such lighting systems are known per se and are also referred to as edge lighting systems. They are used inter alia as backlighting systems in (picture) display devices, for example for TV sets and monitors. Such lighting systems are particularly suitable for use as backlights for non-emissive displays such as liquid crystal display devices, also referred to as LCD panels, which are used in (portable) computers or (portable) telephones.

Said display devices usually comprise a substrate provided with a regular pattern of pixels which are each controlled by at least one electrode. The display device utilizes a control circuit for achieving a picture or a data-graphic display in a relevant field of a (picture) screen of the (picture) display device. The light originating from the backlight in an LCD device is modulated by means of a switch or modulator, various types of liquid crystal effects being used. In addition, the display may be based on electrophoretic or electromechanical effects.

Such lighting systems are also used as luminaires for general lighting purposes or for shop lighting, for example shop window lighting or lighting of (transparent or semi-transparent) plates of glass or synthetic resin on which items, for example jewelry, are displayed. Such lighting systems are further used as window panes, for example for causing a glass wall to radiate light under certain conditions, or to reduce or block out the view through the window by means of light. A further alternative application is the use of such lighting systems for illuminating advertising boards.

In the lighting systems mentioned in the opening paragraph, the light source used is usually a tubular low-pressure mercury vapor discharge lamp, for example one or a plurality of cold-cathode fluorescent lamps (CCFL), wherein the light emitted by the light source during operation is coupled into the light-emitting panel, which acts as an optical waveguide. This waveguide usually constitutes a comparatively thin and planar panel which is manufactured, for example, from synthetic resin or glass, and in which light is transported through the optical waveguide under the influence of (total) internal reflection.

As an alternative light source, such a lighting system may also be provided with a plurality of optoelectronic elements, also referred to as electro-optical elements, for example electroluminescent elements, for example light-emitting diodes (LEDs). These light sources are usually provided in the vicinity of or tangent to a light-transmitting edge surface of the light-emitting panel, in which case light originating from the light source is incident on the light-transmitting edge surface during operation and distributes itself in the panel.

A lighting system is known from U.S. Pat. No. 5,575,549. Light from a linear light source with a uniform brightness is coupled into a light-emitting panel, also referred to as light pipe, via a light incident edge surface. Part of the light transmitted through said light incident edge surface is made incident upon inclined surfaces of conical or polygonal pyramid-shaped so-called concave portions. Light is coupled out of the light-emitting panel after the light has been refracted at the concave portions in the light-conducting member.

A drawback of the known lighting system is that the uniformity distribution of the light coupled out of the light-emitting panel still is relatively poor.

It is an object of the invention to eliminate the above disadvantage wholly or partly. According to the invention, a lighting system of the kind mentioned in the opening paragraph is for this purpose characterized in that the rear wall in a first portion of the light-emitting panel is provided with a multiplicity of steps, and in that a second portion of the light-emitting panel widens from the input edge surface in a direction facing the first portion.

Since the second portion of the light-emitting panel widens from the input edge surface towards the first portion, the light coupled into the light-emitting panel at the input edge surface cannot leave the light-emitting panel during its first travel through the light-emitting panel from the input edge surface towards the first portion. The angular light distribution of light traveling through such a wedge-shaped second portion of the light-emitting panel becomes gradually narrower. Generally speaking, light is collimated in a light-emitting panel which widens. In a light-emitting panel based on total internal reflection (TIR), light not exceeding a limit angle cannot be coupled out of a light-emitting panel. In the reverse situation, in which light travels through a light-emitting panel which narrows, the angular light distribution becomes gradually greater. Since the light coupled into the light-emitting panel at the input edge surface during its first travel through the second portion of the light-emitting panel cannot leave this second portion of the light-emitting panel, it is promoted that the light during this travel through the second portion of the light-emitting panel distributes itself in the light-emitting panel, and also that the light, if originating from two or more, possibly differently colored light sources, is satisfactorily mixed. A good distribution and/or mixing of light promotes the uniformity of the light issued from the light-emitting panel. The second portion of the light-emitting panel acts as if it were a light-mixing chamber for light on its first path through a widening second portion of the light-emitting panel. Such a "light-mixing chamber" is usually provided outside the light-emitting panel in known lighting systems, which is why such light-emitting panels occupy more space than necessary. By employing a light-emitting panel with a wedge-shaped second portion according to the invention, the "light-mixing chamber" is integrated into the light-emitting panel leading to a considerable saving in space.

It is noted that wedge-shaped light-emitting panels are known per se (see, e.g. the lighting system known from U.S. Pat. No. 5,575,549), but such known wedge-shaped light-emitting panels are widest at the area of the edge surface where light is coupled into the light-emitting panel and narrowest at the opposite end of the light-emitting panel.

Normally, the second portion would end in a reflecting edge surface on the side of the light-emitting panel facing the input edge surface. After reflection the angular light distribution increases again, in dependence on the manner in which the reflection takes place. On its return path through such a light-emitting panel, light will have a further increasing angular distribution owing to the fact that the lightemitting panel gradually narrows. At a certain moment the angular light distribution will have become so wide that part of it exceeds the limit angle for total internal reflection, and light will issue from the light-emitting panel. Normally, upon reflection the light is given a tilt such as to promote the output of light on its way back in the direction of the input edge surface. However, such a tilt given to the reflected light should be such that the light is coupled out over the whole area of the front wall of the light-emitting panel to uniformly illuminate the display device. Under said reflection conditions a bright band of light is issued from the front wall of the light-emitting panel in the vicinity of said reflecting edge surface. The brightness of said band of light is substantially higher than the light emitted from the rest of the front wall of the light-emitting panel. A solution would be to exclude this bright band of light from the light contributing to illuminating the display device. However such shielding is space consuming and the system efficiency would be reduced.

The inventors have had the insight that the above-described bright band of light originated from light coupled out directly after reflection at the reflecting edge surface. The light coupled out at the bright band of light is practically the sum of all light coupled in at solid angles larger than a limit angle, for which the angle after reflection at the reflecting edge surface is equal to the critical angle for TIR. According to the measure of the invention the rear wall in the first portion of the light-emitting panel is provided with a multiplicity of steps. As a consequence, the bright band of light is split into many shorter bright bands of light which are spread over the front wall of the light-emitting panel. The spatial frequency of the steps in the first portion of the light-emitting panel can be chosen such that the brightness modulation from the many small bands of light can no longer be resolved, so that the brightness is averaged and appears homogeneous. The averaged, i.e. lower brightness of the bright band of light can be tuned so as to be equally high as the brightness of the remaining part of the front wall.

A particularly compact lighting system is obtained through the measure according to the invention, with a high uniformity of the distribution of the light emitted by the lighting system. A more uniform illumination of the display device is realized thereby, in particular in the case of (picture) display devices.

A preferred embodiment of the lighting system according to the invention is characterized in that a surface of the steps facing the in-coupling edge surface makes an angle $\beta$ with respect to a normal on a bisecting plane bisecting the light-emitting panel, wherein the bisecting plane comprises a bisecting line in the input edge surface, said bisecting line being parallel to the front wall and bisecting the input edge surface, and wherein the angle $\beta$ is at least 5°.

The bisecting plane makes an angle with the front wall of the light-emitting panel and divides the second portion of the light-emitting panel in half. The angle $\beta$ is responsible for the rotation of the angular intensity distribution of the returning light such that the light on its way back is extracted over the entire length of the second portion of the light guide. Depending on the ratio of the surface area $S_{es}$ of the input edge surface and the largest surface area $S_{tr}$ in the light-emitting panel, the form of the surface of the steps can be chosen to be flat for ratios $S_{tr}/S_{es} \leq 2.5$. Otherwise, the angle $\beta$ must be varied to ensure a widening of the angular intensity distribution, and the form of the step surfaces will be preferably curved. In the following, values for the average value of $\beta$, $\beta_{av}$, will be discussed.

Preferably, the angle $\beta_{av}$ is in the range from $5 \leq \beta \leq 25°$. Two different embodiments of the light guide ending and reflecting surface can be distinguished. One embodiment includes an air gap between light guide ending and (diffuse) reflecting surface. In this case, $\beta_{av} > 5°$ for a light guide material with refraction index $n \approx 1.5$ to ensure that light extraction starts in the beginning of the second portion of the light guide, where "beginning" means the side opposite to the input edge surface of the panel. Equally, $\beta_{av}$ must not be too large, to ensure that light is still extracted close to the input edge surface. Simulations have shown that values for $\beta_{av} > 25°$ are disadvantageous. This can be attributed to the fact that the portion of light that after reflection is outside the regime of total internal reflection increases with increasing values of $\beta$. Of course this also relates to the angular distribution of the light when it is coupled into the light guide. A smaller angular distribution at this stage makes larger values of $\beta$ possible and/or necessary, but to obtain this narrower distribution a larger thickness of the light guide at the input edge is required, which again is disadvantageous.

A preferred embodiment of the lighting system according to the invention is characterized in that the surface of the steps facing the input edge surface comprises a specular reflector on a side facing away from the input edge surface. Such a specular reflector provides the desired reflection of the light traveling from the input edge surface and stimulates the coupling out of light from the light-emitting panel.

In an alternative embodiment, the steps comprise a diffuser on a side facing away from the light-emitting panel, an air gap being maintained between the steps and the diffuser or at least optical contact being prevented between the light guide and the diffuse reflector. Preferably, the diffuser is made from a diffuse, highly reflecting material copying the shape of the steps of the first portion of the light-emitting panel. In this case the thickness of the air gap between light-emitting panel and the diffuser should be carefully controlled. Preferably, the diffuse material has a very short penetration depth (<0.1 mm). The advantage of employing a diffuser is the very high robustness against light source radiation pattern and input geometries.

A preferred embodiment of the lighting system according to the invention is characterized in that the ratio of the surface area $S_{es}$ of the input edge surface to the surface area $S_{tr}$ in the light-emitting panel at the transition between the first portion and the second portion of the light-emitting panel satisfies the relation $1 < S_{tr}/S_{es} < 10$. Light originating from the light source and coupled into the second portion of a light-emitting panel has an angular distribution which varies between approximately +42° and −42°, for typical light guide materials with a refractive index of approximately 1.5. The lower limit for the ratio of the cross section $S_{tr}$ at the transition between the first and the second portion, where the light-emitting panel has the largest thickness, and the surface area $S_{es}$ of the input edge surface, is given by the fact that the light-emitting panel is wedge-shaped in the second portion of the light-emitting panel. The upper limit for the ratio $S_{tr}/S_{es} < 10$ is determined by the wish that the light-emitting panel should not become too thick. In principle, the dimensions (screen diameter) of, for example, the display device determine the size (diameter) of the light-emitting panel. If the input edge surface has a thickness of 2 mm, then the equation $S_{tr}/S_{es}=10$ means that either the second edge surface or the cross-section of the light-emitting panel parallel to the input edge surface at the location of the largest thickness of the light-emitting panel will have a thickness of 20 mm. The ease of manufacture of the light-emitting panel is also reduced in the case of such high ratios.

Preferably, the ratio $S_{tr}/S_{es}$ satisfies the relation $1.5<S_{tr}/S_{es}<4$. Light-emitting panels with a $S_{tr}/S_{es}$ ratio in the preferred range can be readily manufactured in an (injection) molding process.

The light source used may be formed by LEDs, for example white LEDs or different types of LEDs and/or LEDs of different colors which are combined with one another. Colors may be mixed in a desired manner through a suitable use of LEDs, for example for making white light of a desired color temperature. For this purpose, an embodiment of the lighting system according to the invention is characterized in that the light source comprises one white LED or at least two light-emitting diodes with different light emission wavelengths. Preferably, the light source comprises three light-emitting diodes. Employing a single white LED is advantageous because the widening portion of the light-emitting panel is used for the homogenization of the light distribution in the light-emitting panel. The LEDs preferably comprise the combinations of red, green, and blue LEDs known per se, or, for example, combinations of red, green, blue, and amber LEDs. LEDs with three light emission wavelengths may also be realized by means of two LEDs with different light emission wavelengths, wherein the LEDs of one of the types are (partly) provided with a phosphor, such that the light emission of the LED is converted by the phosphor into light of a third, desired light emission wavelength. A combination, known per se, of the red, green, and blue LEDs renders it possible to realize color changes independently of the status of the display device. The use of LEDs has the further advantage that dynamic lighting possibilities are obtained. For this purpose, a sensor is present at one of the edge surfaces for measuring the optical properties of the light emitted by the light source during operation.

The quantity of light emitted by the LEDs is adjusted in that the luminous fluxes of the light-emitting diodes are varied. This control of the luminous flux usually takes place in an energy-efficient manner. Thus the LEDs can be dimmed without an appreciable loss in efficacy. Preferably, the intensity of the light emitted by the light-emitting diodes is variable in response to the illumination level of a picture to be displayed by the display device or in response to the level of the ambient light. Preferably, the color point of a picture displayed by the display device is determined by the lighting system. An (improved) dynamic range (for example contrast) of the picture to be displayed by the display device is achieved thereby.

Preferably, each of the light-emitting diodes has a luminous flux of at least 5 lm. Such high values are particularly useful for high-brightness, large-screen applications, i.e. with a value of the quotient of the light emitting panel luminous output and the panel diagonal of more than 10 lm/inch. LEDs with such a relatively high output are also referred to as LED power packages. The use of these high-efficiency, high-output LEDs has the specific advantage that the number of LEDs required for a desired, comparatively high light output can be comparatively small. This benefits the compact construction and the efficiency of the lighting system to be manufactured. Further advantages of the use of LEDs are a comparatively very long useful life, the comparatively low energy cost, and the low maintenance cost for a lighting system with LEDs.

A considerable length is available for mixing the various light colors until the desired color mixture has been reached, for example white light of a predetermined color temperature, in a lighting system with a light-emitting panel comprising a wedge-shaped portion widening from the input edge surface, and in which the light cannot be coupled out during its first travel through the widening (second) portion of the light-emitting panel. Light-emitting panels of comparatively large dimensions can be realized in this manner with a light source which comprises in total, for example, six or even only three (high-output) light-emitting diodes with different light emission wavelengths. In an alternative embodiment a single LED suffices. In the known lighting system, a light-mixing chamber of considerable dimensions is usually necessary for such a limited number of LEDs in order to achieve that the light is sufficiently distributed and, in the case of multiple LEDs, mixed in the light-emitting panel so as to provide a uniform and homogeneous coupling-out of light from the light-emitting panel in the direction of the (picture) display device.

In a further preferred embodiment, the lighting system comprises control electronics for changing the luminous flux of the light source. The desired lighting effects are achieved by means of suitable control electronics, and the uniformity of the emitted light is improved. White light is also obtained through a suitable combination of LEDs, for which the control electronics provide the possibility of adjusting the desired color temperature.

A particularly compact lighting system is obtained through the measure according to the invention, with a high uniformity of the distribution of the light emitted by the lighting system. A more uniform illumination of the display device is realized thereby in particular in the case of (picture) display devices.

The invention will now be explained in more detail with reference to a number of embodiments and a drawing, in which.

The Figures are purely diagrammatic and not drawn true to scale. Some dimensions are particularly strongly exaggerated for reasons of clarity. Equivalent components have been given the same reference numerals in the Figures whenever possible.

Figure 1A:
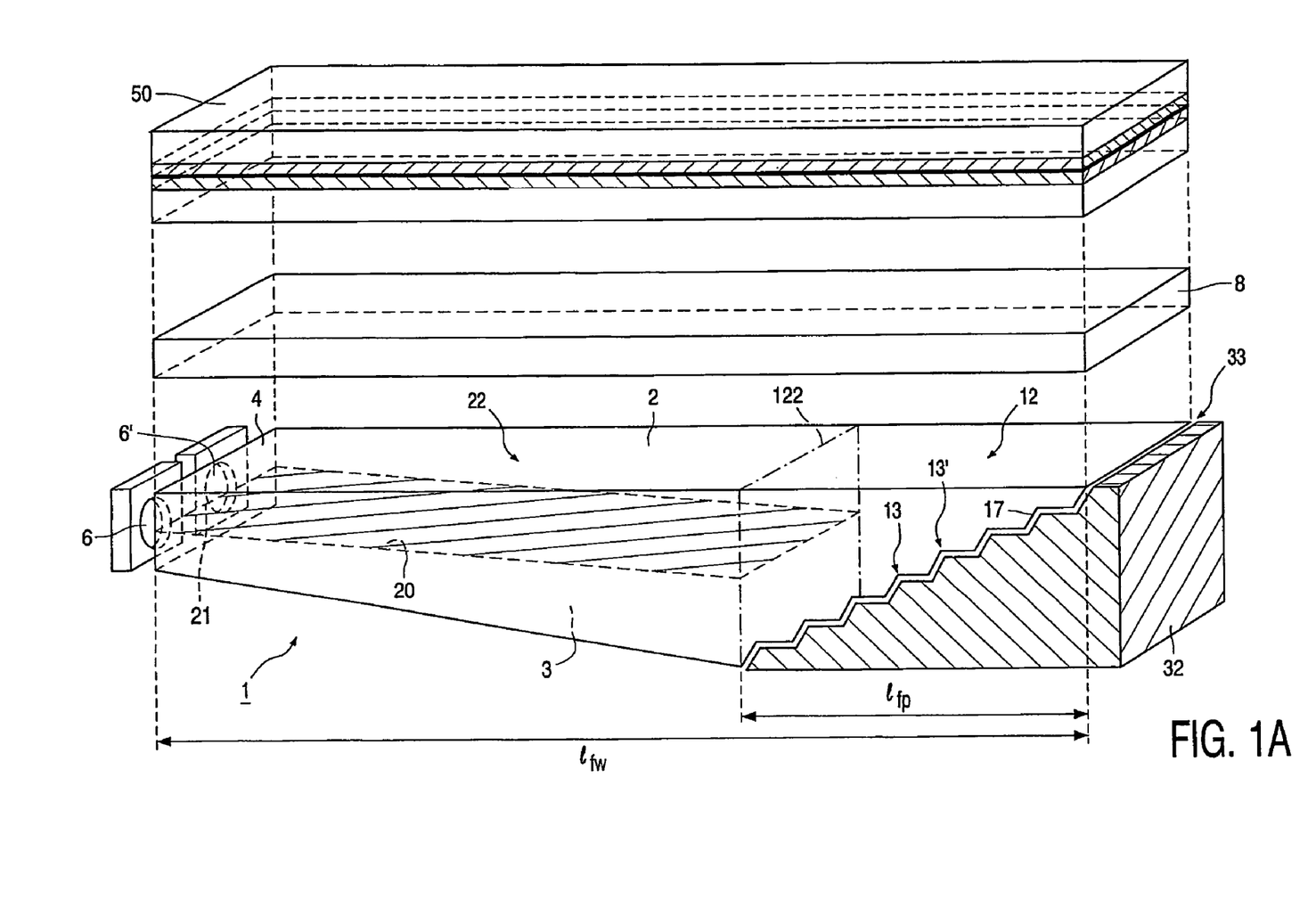
FIG. 1A is a perspective view of a display device comprising an embodiment of the lighting system according to the invention.

FIG. 1A shows very schematically a perspective view of a display device comprising an embodiment of the lighting system according to the invention. The lighting system comprises a light-emitting panel 1 of a light-transmitting material. The light-emitting panel 1 is manufactured, for example, from a synthetic resin, from acryl, from polycarbonate, from pmma, for example perspex, or from glass. Light is transported through the light-emitting panel 1 during operation, utilizing total internal reflection (TIR). The light-emitting panel 1 has a front wall 2 and a rear wall 3 opposite thereto. An input edge surface 4 is provided between the front wall 2 and the rear wall 3 of the light-emitting panel 1. In the example of FIG. 1A, the input edge surface 4 is at an angle between 80 and 100° with respect to the front wall 2 of the light-emitting panel 1. The input edge surface 4 is light-transmitting. The lighting system comprises a light source 6, 6', . . . for example a number of light-emitting diodes (LEDs). In the situation shown in FIG. 1, light originating from the light source 6, 6', . . . is incident on the input edge surface 4 of the light-emitting panel 1 during operation, which light distributes itself in the light-emitting panel 1. Reflector means (not shown in FIG. 1A) may be provided between the light source 6, 6', . . . and the input edge surface 4 to guide the light of the e.g. LEDs into the light-emitting panel 1. In an alternative embodiment the LEDs are provided inside the light-emitting panel. To this end the light-emitting panel may be provided with an indentation the shape of which is substantially complementary to the shape of the light source. In this case the indentation functions as the input edge surface. According to the measure of the invention, the rear wall 3 in a first portion 12 of the light-emitting panel 1 is provided with a multiplicity of steps 13, 13', . . . (see also FIG. 1B). In addition, a second portion 22 of the light-emitting panel 1 widens from the input edge surface 4.

Light is coupled into the light-emitting panel 1 at the thin end (input edge surface 4) of second portion 22 of the light-emitting panel 1 and propagates towards the first portion 12 of the light-emitting panel 1. In the example of FIG. 1A, light-emitting panel 1 reaches its largest cross section $S_{tr}$ at the transition between the first and the second portion. This transition is indicated in FIG. 1A by means of an imaginary plane with reference numeral 122. In the first portion 12, light is reflected at surfaces 17 of the steps 13, 13', . . . , said surfaces 17 facing the input edge surface 4. After reflection, the light can be coupled out of the light-emitting panel 1.

As a rule of thumb, the height $h_{st}$ of a step is preferably in the range $0.1 \leq h_{st} \leq 0.5$ mm; the last step, closest to the front wall, may be chosen thicker (e.g. 2 mm) for mechanical reasons, the angle β of that particular step being reduced accordingly. In addition, the distance $d_{st}$ between two steps is in the range $0.1 \leq d_{st} \leq 10$ mm.

The spatial frequency of the steps in the first portion of the light-emitting panel can be chosen such that the brightness modulation from the many small bands of light can no longer be resolved, so that the brightness is averaged and appears homogeneous. Therefore, a preferred embodiment of the lighting system according to the invention is characterized in that the number of steps is in the range from 25 to 100.

A preferred embodiment of the lighting system according to the invention is characterized in that the length $l_{fp}$ of the first portion as compared to the length $l_{fw}$ of the front wall is in the range $0.05 \leq l_{fp}/l_{fw} \leq 0.6$. By selecting a ratio $l_{fp}/l_{fw}$ in the given range, a further improvement of the uniformity distribution of the light coupled out of the light-emitting panel is achieved.

Preferably, the ratio of the surface area $S_{es}$ of the input edge surface 4 to the surface area $S_{tr}$ in the light-emitting panel at the imaginary transition plane 122 between the first portion 12 and the second portion 22 of the light-emitting panel 1 satisfies the relation $1 < S_{tr}/S_{es} < 10$. Particularly preferred is a ratio $S_{tr}/S_{es}$ satisfying the relation $1.5 < S_{tr}/S_{es} < 4$. Light-emitting panels in which the $S_{tr}/S_{es}$ ratio lies within the preferred range can be readily manufactured in an (injection) molding process. A particularly suitable ratio is $S_{tr}/S_{es} \approx 2$. For example, a suitable thickness of the input edge surface 4 is 3 mm, which means that for $S_{tr}/S_{es}=2$ the largest thickness of the light-emitting panel 1 is 6 mm. An alternative suitable thickness for the input edge surface 4 is 1 mm, which means that the largest thickness of the light-emitting panel 1 is 2 mm in the case of $S_{tr}/S_{es}=2$.

Since the second portion 22 of the light-emitting panel 1 widens from the input edge surface 4, light cannot leave the light-emitting panel 1 during its first travel through the widening second portion 22. It is thus promoted that the light in its first travel through the second portion 22 of the light-emitting panel 1 distributes itself and is mixed in the light-emitting panel 1. A good distribution and/or mixing of light promotes the uniformity and the homogeneity of the light coupled out of the light-emitting panel 1. The second portion 22 of light-emitting panel 1, as shown in FIG. 1A, acts as it were as a light-mixing chamber for light during its first travel through a widening light-emitting panel. According to the measure of the invention, the light-mixing chamber is as it were integrated into the light-emitting panel, which leads to a considerable saving in space. A particularly compact lighting system is obtained through the measure according to the invention, with a high uniformity of the distribution of the light emitted by the lighting system.

In FIG. 1A, the length $l_{fp}$ of the first portion 12 is indicated as well as the length $l_{fw}$ of the front wall 2. Preferably, the ratio is in the range $0.05 \leq l_{fp}/l_{fw} \leq 0.6$. If, by way of example, the length $l_{fw}$ of the front wall 2 is approximately 300 mm, the length $l_{fp}$ of the first portion 12 is approximately 30 mm, i.e. $l_{fp}/l_{fw} \approx 0.1$. Preferably, the number of steps 13, 13', . . . lie in the range from 25 to 100. In the example given ($l_{fp} \approx 30$ mm), a particularly advantageous number of steps is 50. Preferably, the height $h_{st}$ of a step 13, 13', . . . (see FIG. 1B) is in the range $0.1 \leq h_{st} \leq 0.5$ mm. A light-emitting panel 1 with such steps can be easily manufactured.

In the example of FIG. 1A, a diffuser is provided behind the steps 13, 13', . . . while an air gap 33 is maintained between the steps 13, 13', . . . and the diffuser 32. In the example of FIG. 1A, the diffuser 32 is a block with a shape complementary to that of the steps 13, 13', . . . of the first portion 12 of the light-emitting panel 1. Preferably, the diffuser 32 is made from a diffuse, highly reflecting material, for instance Teflon, diffusely reflecting aluminum or a coating containing highly reflecting particles such as halophosphates, calcium pyrophosphate, strontium pyrophosphate and titanium dioxide or e.g. an expanded polytetrafluoroethylene coating. Such coatings, which show a long penetration depth, can be used as a thin layer (0.1 mm) in combination with a specular reflector layer arranged therebehind to achieve higher reflectivity. Likewise, the white powders could be applied onto the light guide, the approximately spherical grains assuring that there is virtually no optical contact between powder layer and light guide, and a solid specular reflector positioned therebehind to keep the powder in place. Preferably, the diffuse material has a very short penetration depth (<0.1 mm). Likewise, the air gap has to be small (<0.1 mm) and controlled in thickness over the edge height (preferably ±0.025 mm). In an alternative embodiment of the lighting system the surface of the steps facing the input edge surface comprises a specular reflector on a side facing away from the input edge surface (not shown in FIG. 1A).

The light-emitting panel 1, during operation, emits light in the direction of a display device for example a liquid crystal display (LCD) device 50 via a translucent diffuser 8 in order to further homogenize the light issued from the light-emitting panel 1. The assembly of the light source 6, 6', . . . , the lightemitting panel 1, and the LCD device 50, whether or not accommodated in a housing (not shown in FIG. 1A), forms a display device for displaying, for example, (video)images. The light-emitting panel 1 may further be provided with a sensor (not shown in FIG. 1A) for measuring the optical properties of the light. This sensor is coupled to control electronics (not shown in FIG. 1A) for suitably adapting the luminous flux of the light source 6, 6', . . . . A feedback mechanism can be realized by means of the sensor and the control electronics for influencing the quality and the quantity of the light coupled out of the light-emitting panel.

In an alternative embodiment, the front wall 2 is provided with a light redirecting foil.

Preferably, the light source 6, 6', . . . comprises one white LED or at least two light-emitting diodes with different light emission wavelengths. Preferably, the light source comprises three light-emitting diodes with a blue, a green, and a red light emission wavelength. The source brightness of a LED is usually many times higher than that of a fluorescent tube. Furthermore, the coupling efficiency of light into the panel with the use of LEDs is greater than with the use of fluorescent tubes. The use of LEDs as a light source has the advantage that the LEDs may lie against panels made from synthetic resin. LEDs transmit hardly any heat in the direction of the light-emitting panel 1, nor do they generate detrimental (UV) radiation. The use of LEDs, in addition, has the advantage that no means need be applied for coupling the light originating from the LEDs into the panel. The LEDs in the lighting system may comprise suitably chosen clusters of blue, green, and red LEDs, or suitable alternative combinations of single-color or dual-color LEDs, or a plurality of white LEDs with high luminous flux.

The LEDs used in a large-screen, high-brightness lighting system, characterized by a value of the quotient of the light emitting panel luminous output and the panel diagonal of more than 10 lm/inch, are preferably LEDs which each have an optical power of at least 50 mW. LEDs with such a high output are also referred to as LED power packages. Examples of power LEDs are LEDs of the "Luxeon™" type (Lumileds), of which the luminous flux per LED is 35 lm for red, 30 lm for green, 8 lm for blue, and 40 lm for amber LEDs. In alternative embodiments, yellow, amber, cyan, magenta, and/or purple LEDs are used which have a comparatively high light output (whether or not with the aid of two spectral light emission wavelengths). It is also possible to use a plurality of white LEDs of high luminous flux. In further alternative embodiments, red LEDs may be used in combination with blue LEDs which are provided with a phosphor, such that the latter emit in two spectral bands, i.e. a blue and a green band.

Preferably, the LEDs are mounted on a (metal-core) printed circuit board (not shown in FIG. 1A). When power LEDs are provided on such a (metal-core) printed circuit board (PCB), the heat generated by the LEDs can be readily removed by the PCB through thermal conduction. An interesting embodiment of the lighting system is furthermore one in which the (metal-core) printed circuit board is in contact with the housing of the display device via a thermally conducting connection.

Figure 1B:
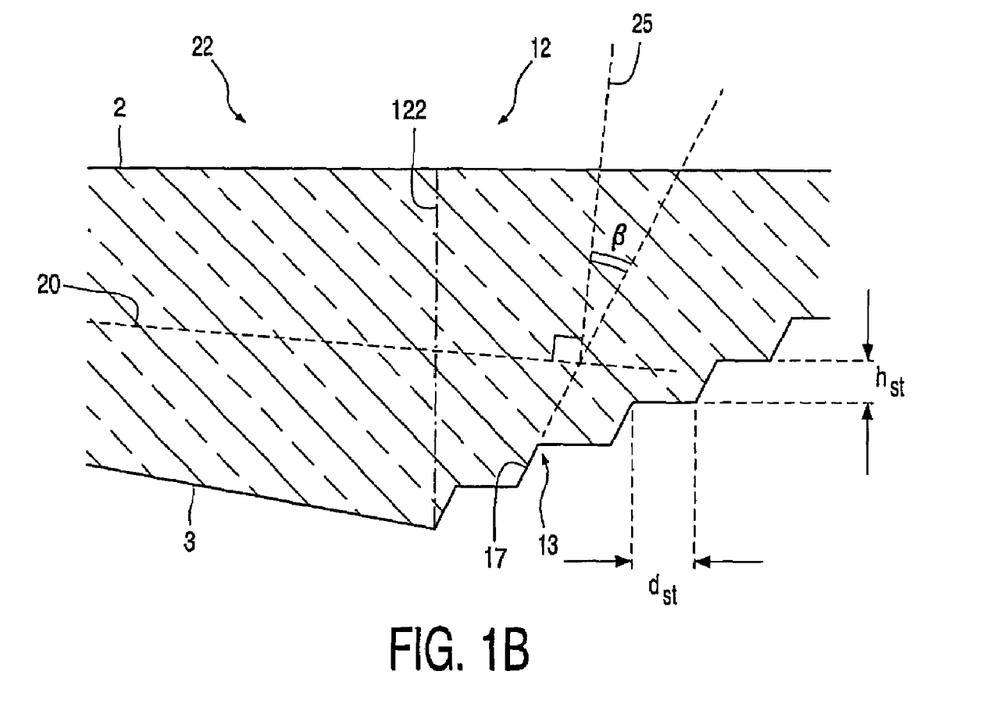
FIG. 1B is a cross-sectional view of a detail of the lighting system as shown in FIG. 1A.

FIG. 1B shows a cross-sectional view of a detail of the lighting system as shown in FIG. 1A. In the first portion 12, a surface 17 of the steps 13, 13', . . . facing the input edge surface 4 makes an angle $\beta \geq 5°$ with respect to a normal 25 on a bisecting plane 20 bisecting the light-emitting panel 1. The bisecting plane 20 makes an angle with the front wall 2 of the light-emitting panel 1 and divides the second portion 22 of the light-emitting panel 1 in half. To this end, the bisecting plane 20 comprises a bisecting line 21 in the input edge surface 4, said bisecting line 21 being parallel to the front wall 2 and bisecting the input edge surface 4. Preferably, the angle $\beta_{av}$ is in the range $5° \leq \beta_{av} \leq 25°$. Particularly preferred is an angle $\beta_{av}$ of approximately 15°–19°.

Figure 2A:
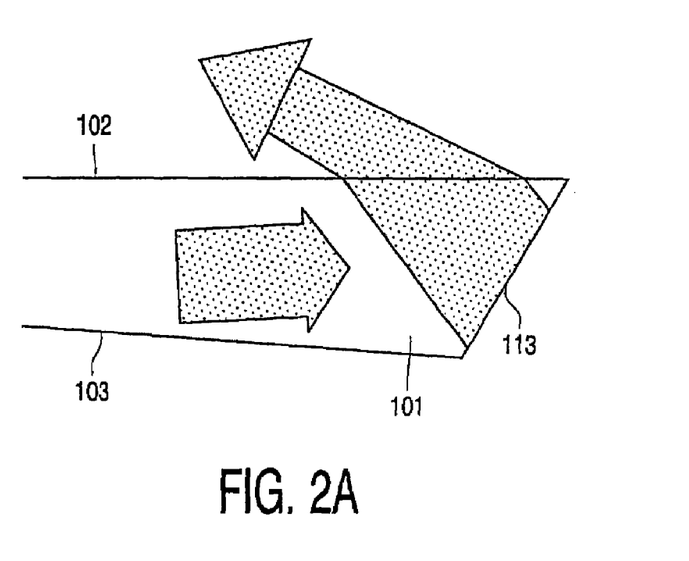
FIG. 2A shows the light emitted from a wedge-shaped light-emitting panel with a single step which upon reflection at the surface of the step is outside the regime of total internal reflection.

FIG. 2A shows very schematically the light in a wedge-shaped light-emitting panel 101 with a front wall 102 and a rear wall 103 and with a single step 113 ("single-facet back reflector"). It can be seen that at the edge of the front wall 102 facing away from the light source (not shown in FIG. 2A) a bright band of light is formed. The brightness of said band of light is substantially higher (factor of two or more) than the light emitted at the rest of the front wall 102 of the light-emitting panel 101. A solution would be to exclude this bright band of light from the light contributing to illuminating the display device. However, making this part of the front wall 102 not "available" is disadvantageous. Such a shielding is space consuming, which is a problem if the light-emitting panel 101 is applied as backlight for display devices, in particular for (laptop) LCD backlighting. In addition, the system efficiency would be reduced (depending on the geometry this may be by more than 10%) which is particularly important in the case of (laptop) display devices.

Figure 2B:
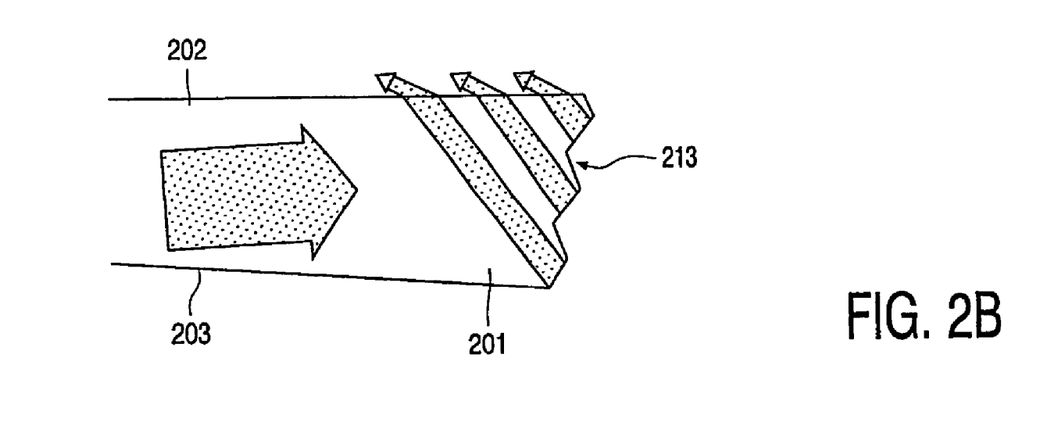
FIG. 2B shows the light emitted from a wedge-shaped light-emitting panel which upon reflection at the surface of the steps is outside the regime of total internal reflection in a panel with a number of steps which are not spaced apart, β taking alternately positive and negative values.

FIG. 2B shows very schematically the light emitted in a wedge-shaped light-emitting panel 201 with a front wall 202 and a rear wall 203 and with a number of steps 213 with no distance between the steps 213 ("multi-facet back reflector"). The situation is improved with respect to the situation in FIG. 2A. Multiple bright bands of light are created. However, the bright bands of light occur still relatively close to the edge of the front wall 202 facing away from the light source (not shown in FIG. 2B).

Figure 2C:
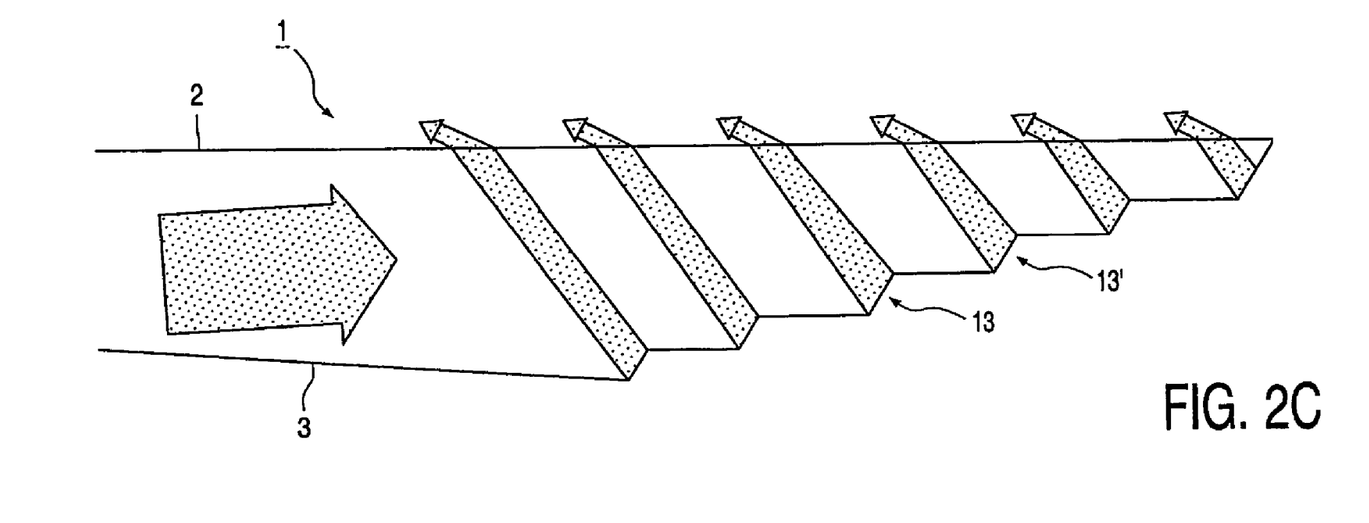
FIG. 2C shows the light which upon reflection at the surface of the steps is outside the regime of total internal reflection and subsequently is emitted from a wedge-shaped light-emitting panel according to the invention with a number of steps which are at a certain distance with respect to each other.

FIG. 2C shows very schematically the light in a wedge-shaped light-emitting panel 1 with a front wall 2 and a rear wall 3 and, according to the invention, with a number of steps 13, 13', . . . spaced with respect to each other ("stretched multi-facet back reflector") (see also FIGS. 1A and 1B). The bright bands of light are distributed over a relatively large part of the front wall 2 of the light-emitting panel 1.

Figure 3:
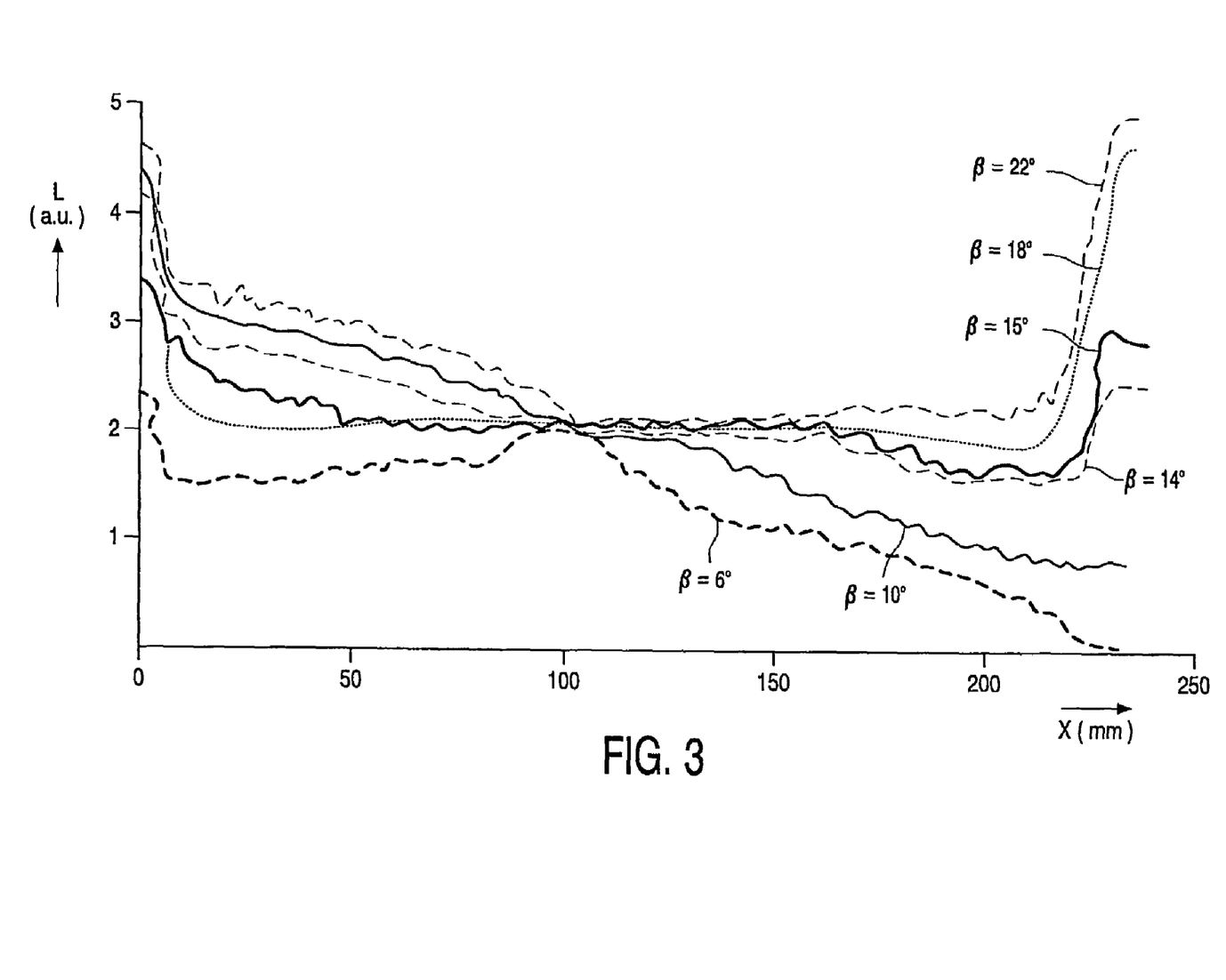
FIG. 3 shows the uniformity distribution of the light emitted by a front wall of a light-emitting panel according to the invention with a single step at various values of the angle β.

FIG. 3 shows the uniformity distribution of the light emitted by a front wall 2 of a light-emitting panel 1 according to the invention for a one-step facet at various values of the angle $\beta$ (see FIGS. 1A and 1B). The length of the front wall 2 in this example is 250 mm. The ratio of the surface area $S_{es}$ of the input edge surface 4 to the surface area $S_{tr}$ in the light-emitting panel at the imaginary transition plane 122 between the first portion 12 and the second portion 22 of the light-emitting panel 1 in the example of FIG. 3 is $S_{tr}/S_{es}=2$. The light source is located on the side of the light-emitting panel 1 where x=0 mm. For values of the angle $\beta \leq 10°$ it can be seen that too much light is emitted at the beginning of the light-emitting panel 1 (i.e. at $x \leq 100$ mm) resulting in a too low light level emitted by the remainder of the front wall 2 (i.e. at x>100 mm). For values of the angle $22° \leq \beta \leq 15°$ it can be seen that the light distribution is relatively flat, but relatively much light is emitted at the end of the light-emitting panel 1 (i.e. at x>225 mm). For values of the angle β of approximately 17°, the stretched m# facet solution of this invention can spread the bright band at the end of the light emitting panel and combine that with a relatively flat light distribution over the entire front wall.

It will be obvious that many modifications are possible to those skilled in the art within the scope of the invention. The scope of protection of the invention is not limited to the embodiments given. The invention resides in each novel characteristic and each combination of characteristics. Reference numerals in the claims do not limit the scope of protection thereof. The use of the verb "comprise" and its conjugations does not exclude the presence of elements other than those specified in the claims. The use of the indefinite article "a" or "an" preceding an element does not exclude the presence of a plurality of such elements.

The invention claimed is:

1. A lighting system provided with a light-emitting panel (1) comprising
    a front wall (2), a rear wall (3) situated opposite thereto, and furthermore, between the front and the rear wall (2, 3), a translucent input edge surface (4) for coupling light into the light-emitting panel (1),
    while at least a light source (6, 6', . . . ) is associated with the input edge surface (4), and
    while, in operation, light originating from the light source (6, 6', . . . ) is incident on the input edge surface (4) and distributes itself in the light-emitting panel (1), characterized
    in that the rear wall (3) in a first portion (12) of the light-emitting panel (1) is provided with a multiplicity of steps (13, 13', . . . ), and
    in that a second portion (22) of the light-emitting panel (1) widens from the input edge surface (4) in a direction facing the first portion (12)
    characterized in that a surface (17) of the steps (13, 13', . . . ) facing the input edge surface (4) makes an average angle $\beta_{av}$ with respect to a normal (25) on a bisecting plane (20) bisecting the light-emitting panel (1),
    wherein the bisecting plane (20) comprises a bisecting line (21) in the input edge surface (4), said bisecting line (21) being parallel to the front wall (2) and bisecting the input edge surface (4), and
    wherein the average angle $\beta_{av}$ is in the range $5 \leq \beta_{av} \leq 25°$.

2. A lighting system as claimed in claim 1, characterized in that the surface (17) of the steps (13, 13', . . . ) facing the input edge surface (4) comprises a specular reflector (31) on a side facing away from the input edge surface (4).

3. A lighting system as claimed in claim 1, characterized in that the steps (13, 13', . . . ) comprise a diffuser (32) on a side facing away from the light-emitting panel (1) while an air gap (33) is maintained between the steps (13, 13', . . . ) and the diffuser (32).

4. A lighting system as claimed in claim 1, characterized in that the height $h_{st}$ of a step (13, 13', . . . ) is in the range $0.1 \leq h_{st} \leq 0.5$ mm.

5. A lighting system as claimed in claim 1, characterized in that the distance $d_{st}$ between two steps (13, 13', . . . ) is in the range $0.1 \leq d_{st} \leq 10$ mm.

6. A lighting system as claimed in claim 1, characterized in that the number of steps (13, 13', . . . ) is in the range from 25 to 100.

7. A lighting system as claimed in claim 1, characterized in that the length $l_{fp}$ of the first portion (12) as compared to the length $l_{fw}$ of the front wall (2) is in the range $0.05 \leq l_{fp}/l_{fw} \leq 0.6$.

8. A lighting system as claimed in claim 1, characterized in that the ratio of the surface area $S_{es}$ of the input edge surface (4) to the surface area $S_{tr}$ in the lightemitting panel (1) at the transition between the first portion (12) and the second portion (22) of the light-emitting panel (1) satisfies the relation $1 < S_{tr}/S_{es} < 10$.

9. A lighting system as claimed in claim 8, characterized in that the ratio is $1.5 < S_{tr}/S_{es} < 4$.

10. A lighting system as claimed in claim 1, characterized in that the front wall (2) is provided with a translucent diffuser (8).

11. A lighting system as claimed in claim 1, characterized in that the front wall (2) is provided with a light redirecting foil.

12. A lighting system as claimed in claim 1, characterized in that the light source (6, 6', . . . ) comprises at least one white LED or at least two lightemitting diodes with different light emission wavelengths.

13. A lighting system as claimed in claim 12, characterized in that each of the light-emitting diodes has a luminous flux of at least 5 lm.

14. A display device provided with a lighting system as claimed in claim 1.

15. A display device as claimed in claim 14, which display device comprises a liquid crystal display (50).

* * * * *